United States Patent
Fujimatsu et al.

(10) Patent No.: US 7,216,982 B2
(45) Date of Patent: May 15, 2007

(54) EYE IMAGE TAKING DEVICE

(75) Inventors: Takeshi Fujimatsu, Yokohama (JP); Masahiro Wakamori, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 320 days.

(21) Appl. No.: 10/525,190

(22) PCT Filed: Jun. 8, 2004

(86) PCT No.: PCT/JP2004/008277

§ 371 (c)(1),
(2), (4) Date: Feb. 22, 2005

(87) PCT Pub. No.: WO2005/004055

PCT Pub. Date: Jan. 13, 2005

(65) Prior Publication Data
US 2005/0270483 A1    Dec. 8, 2005

(30) Foreign Application Priority Data
Jul. 1, 2003    (JP)    ............................. 2003-189370

(51) Int. Cl.
*A61B 3/14* (2006.01)
(52) U.S. Cl. ....................... 351/209; 351/206; 351/221
(58) Field of Classification Search ................ 351/203, 351/205, 206, 209, 210, 221; 382/117, 154, 382/209
See application file for complete search history.

(56) References Cited

U.S. PATENT DOCUMENTS 5,561,289 A * 10/1996 Yamada et al. ............. 250/221
6,095,989 A *  8/2000 Hay et al. ................... 600/558

FOREIGN PATENT DOCUMENTS

| JP | 10-005195 A | 1/1998 |
| JP | 11-191856 A | 7/1999 |
| JP | 2001-167284 A | 6/2001 |
| JP | 2003-037766 A | 2/2003 |
| WO | WO 99/38121 | 7/1999 |

OTHER PUBLICATIONS

International Search Report for PCT/JP2004/008277, dated Sep. 28, 2004.

* cited by examiner

*Primary Examiner*—David Spector
*Assistant Examiner*—Tuyen Tra
(74) *Attorney, Agent, or Firm*—RatnerPrestia

(57) ABSTRACT

An eye image taking device comprises: an imaging unit for taking the eye of a person to be authenticated, as an eye image; an illumination unit for illuminating the eye of the person to be authenticated; an eyeglass reflection detecting unit for detecting an eyeglass reflection from the eye image; and an instruction unit for instructing the person to be authenticated the movement of the imaging unit or the direction of the face of the person to be authenticated, in case an eyeglass reflection detecting portion detects the eyeglass reflection.

11 Claims, 7 Drawing Sheets

100 eye image taking device

FIG. 4A
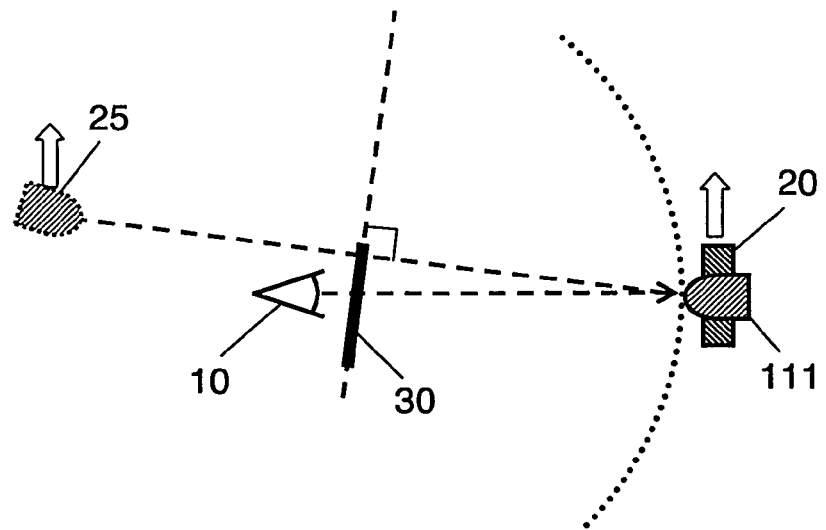
FIG. 4B
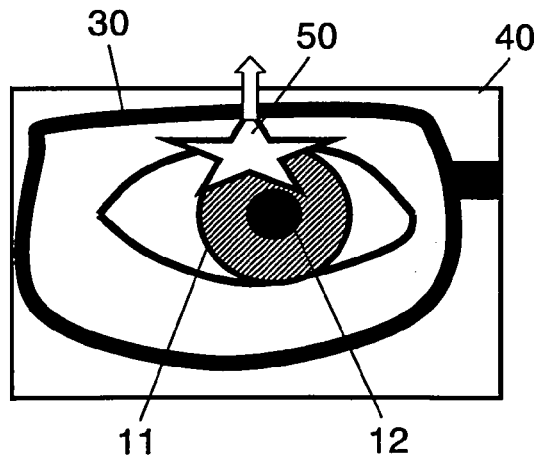
FIG. 4C
| relative positions of eyeglass reflection | up | down | right | left |
|---|---|---|---|---|
| moving direction of camera | up | down | right | left |
| moving direction of face | down | up | left | right |

EYE IMAGE TAKING DEVICE

This application is a U.S. National phase application of PCT International application PCT/JP2004/008277.

TECHNICAL FIELD

The present invention relates to an eye image taking device to be used as an iris authentication device, which can be installed in a mobile terminal.

BACKGROUND ART

Generally, the iris authentication device identifies a person by illuminating the eye of a person to be authenticated with a near infrared ray, by taking the eye image and the circumference image (as will be briefly called the "eye image") with a camera, by extracting the iris information from the eye image obtained, and by comparing the iris information with the iris information which has already been registered in the iris information database. In this personal authentication, the satisfactory eye image has to be taken highly precisely for extracting the iris information of the person to be authenticated precisely. In case the person to be authenticated wears eyeglasses, however, the light reflected by the eyeglasses (as will be briefly called the "eyeglass reflection") may overlap the iris portion, and the iris information may be unable to be extracted.

Thus, there has been proposed either a technique (e.g., JP-A-10-5195), in which an eye image having no eyeglass reflection is taken by disposing a plurality of illuminators having various incidence angles in advance and by using only the illuminator causing no eyeglass reflection selectively, or a technique (e.g., JP-T-2002-501265), in which one image having no eyeglass reflection is obtained by synthesizing a plurality of images having the eyeglass reflection at different positions.

For these techniques, however, it is necessary to dispose the plural illuminators at places apart from the camera such that the optical axes of those illuminators have various angles with respect to the optical axis of the camera. When those techniques are applied to a mobile terminal device such as a mobile telephone desired to reduce the size and weight, there arises a problem that the illuminators cannot be disposed at places apart from the camera. Another problem is that the number of trials is increased to form the plural images.

DISCLOSURE OF THE INVENTION

The present invention contemplates to solve those problems and has an object to provide an eye image taking device, which can acquire a satisfactory eye image at a reduced number of trials even in case a person to be authenticated wears eyeglasses, without disposing a plurality of illuminators at places apart from the camera.

In order to solve the problems, the eye image taking device of the invention is characterized in that, in case an eyeglass reflection is detected in the eye images taken, either the direction for an imaging unit to move or the direction for the face direction of an person to be authenticated to move is instructed so as to acquire the eye image having no eyeglass reflection on the basis of the relative positions between the position of the pupil and the position of the eyeglass reflection.

BRIEF DESCRIPTION OF THE DRAWINGS

FIG. 4A is a diagram showing relations among the relative positions of an eye, a camera, a near infrared illuminator and an eyeglass.

FIG. 4B is a diagram showing one example of the eye image.

FIG. 4C is a diagram showing relative positions of an eyeglass reflection, moving directions of the camera for avoiding the eyeglass reflection, and moving directions of a face.

DETAILED DESCRIPTION OF PREFERRED EMBODIMENTS

An eye image taking device according to the embodiments of the invention will be described with reference to the accompanying drawings.

Embodiment 1

Figure 1:
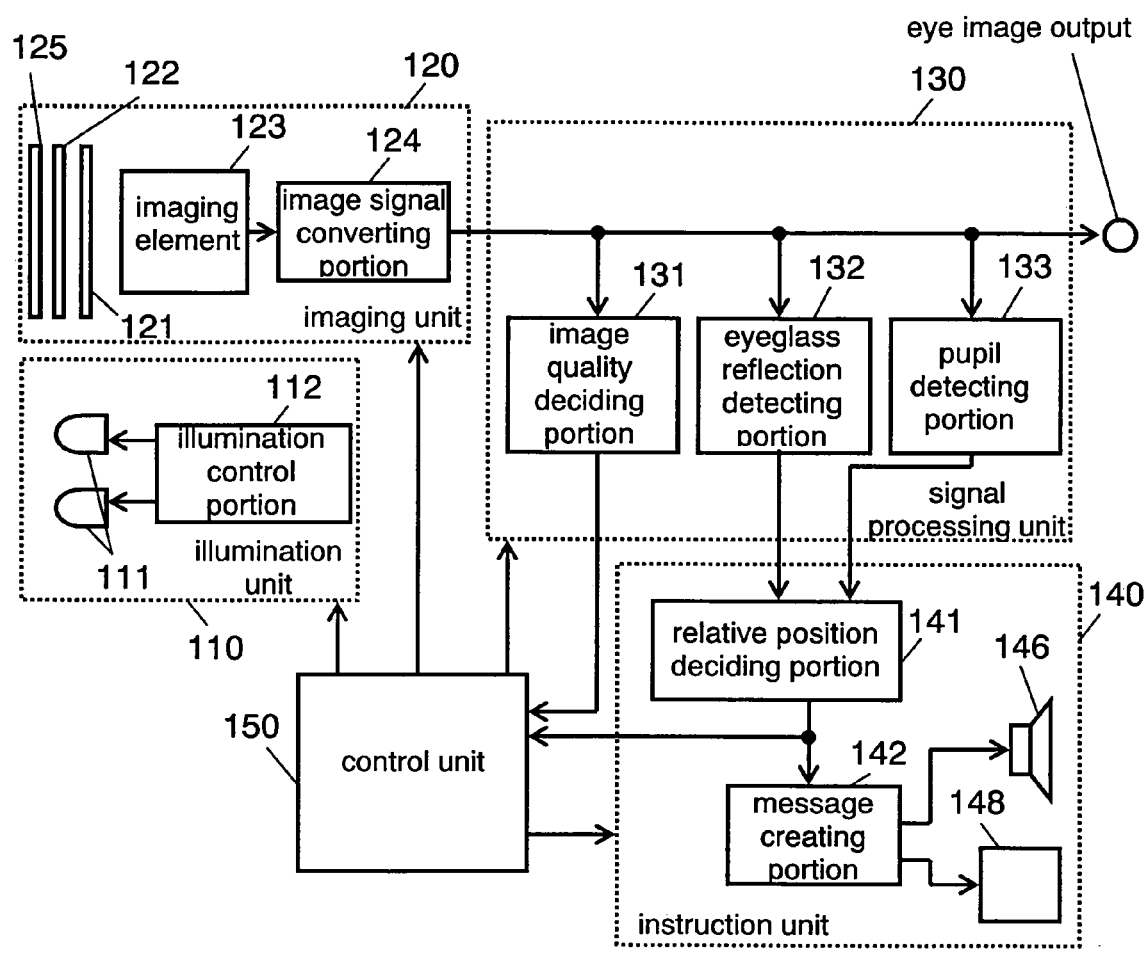
FIG. 1 is a block diagram showing an eye image taking device according to Embodiment 1 of the invention.

FIG. 1 is a block diagram showing an eye image taking device according to Embodiment 1 of the invention. Eye image taking device 100 in this embodiment is provided with: illumination unit 110 for irradiating the eye of a person to be authenticated with a near infrared ray; imaging unit 120 for imaging the eye; signal processing unit 130 for detecting the presence/absence of an eyeglass reflection, the position of the reflection and the position of a pupil and for outputting an eye image for authentication to an iris authenticating device or the like; instruction unit 140 for instructing the person to be authenticated; and control unit 150 for controlling the individual blocks.

Illumination unit 110 includes near infrared ray illuminator 111 and illumination control portion 112, and irradiates the eye of the person to be authenticated with a near infrared ray in a quantity suitable for the eye image acquisition.

Imaging unit 120 includes lens 121, visible light cut filter 122, imaging element 123, image signal converting portion 124 and guide mirror 125. In this embodiment, the optical system is reduced in size and cost by using a fixed focus lens as lens 121. Guide mirror 125 guides the eye to a correct imaging position by reflecting the eye of the person to be authenticated. The eye of the person to be authenticated is irradiated by near infrared ray illuminator 111 and is imaged by imaging element 123 through lens 121 and visible light cut filter 122. Image signal converting portion 124 extracts the image signal components from the output signal of imaging element 123 and outputs the image signal components, after subjected to a conversion such as gain adjustments needed, as image signals. These image signals will be abbreviated into the "eye image", and a series of operations till imaging unit 120 outputs the eye image will be abbreviated into the "image incorporation".

Figure 2:
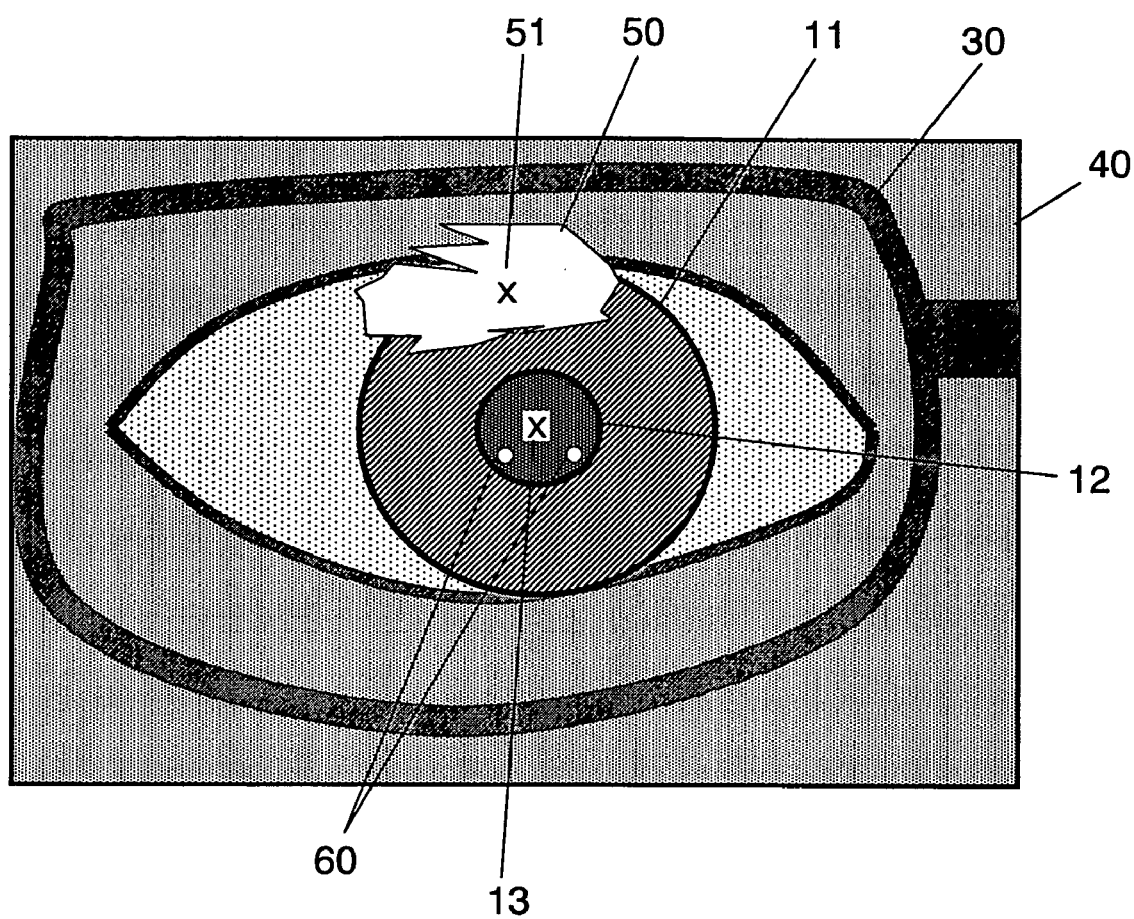
FIG. 2 is a diagram showing one example of an eye image.

Signal processing unit 130 includes image quality deciding portion 131, eyeglass reflection detecting portion 132 and pupil detecting portion 133. Image quality deciding portion 131 decides the brightness, contrast and focus of the taken image signals thereby to decide whether or not the image is suited for the iris authentication. FIG. 2 is a diagram showing one example of the eye image. The description will be continued by assuming that the eye image has incorporated not only iris 11 but also the reflected light of near infrared ray illuminator 111 by eyeglass 30, i.e., eyeglass reflection 50. Eyeglass reflection detecting portion 132 binarizes the acquired image signals to extract the high-brightness area. In case a large high-brightness area exists in addition to a small high-brightness area by cornea reflection 60 from near infrared ray illuminator 111, it is decided as eyeglass reflection 50, and its center of gravity 51 is determined. Pupil detecting portion 133 binarizes the acquired image signals to extract the low-brightness area, and decides the area as pupil 12 from its shape and size to determine pupil center 13.

Instruction unit 140 includes relative position deciding portion 141, message creating portion 142, speaker 146 and liquid crystal display unit 148. In case eyeglass reflection 50 is detected, relative position deciding portion 141 decides the relative position of center of gravity 51 of the eyeglass reflection to pupil center 13. Message creating portion 142 creates a proper message as an instruction to avoid eyeglass reflection 50 on the basis of the signal outputted from relative position deciding portion 141. This message is converted through speaker 146 into a speech message and is displayed in liquid crystal display unit 148.

In Embodiment 1, the description has been made on the method for extracting the low-brightness area of the image signals as the pupil detecting method. There may be used another method such as the pattern matching method using a template having a general pupil shape, or the pattern matching method by detecting cornea reflection 60, which is caused when the illumination light of near infrared ray illuminator 111 is reflected on the cornea.

Here will be described the operations of the eye image taking device in Embodiment 1 of the invention. A message example is described assuming that the eye image taking device is used in an iris authentication device.

Figure 3:
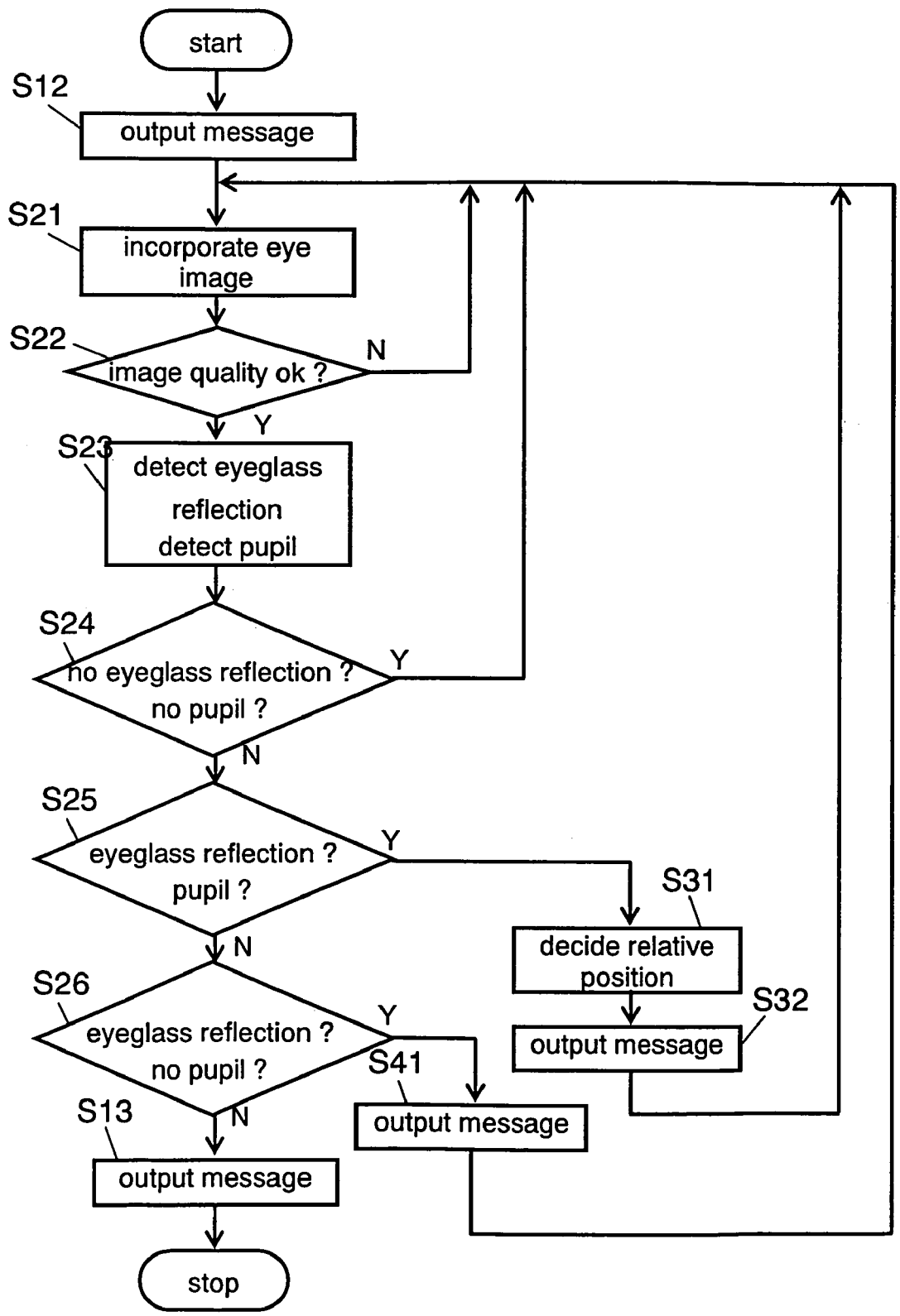
FIG. 3 is a flow chart showing an operating procedure of the eye image taking device in Embodiment 1 of the invention.

FIG. 3 is a flow chart showing an operating procedure of the eye image taking device in Embodiment 1 of the invention. When the person to be authenticated performs an authentication starting operation to start the authentication, message creating portion 142 creates a message to start the authentication, such as "Start Authentication." This content is displayed in liquid crystal display unit 148 and is outputted through speaker 146 as a speech message (at S12).

Next, imaging unit 120 incorporates the image (at S21). Image quality deciding portion 131 decides (at S22) whether or not the incorporated image can be used for the iris authentication. If No, the procedure returns to Step S21 to incorporate the image again. If Yes, pupil detecting portion 133 detects pupil 12 and pupil center 13, and eyeglass reflection detecting portion 132 detects eyeglass reflection 50 and its center of gravity 51 (at S23). In case neither pupil 12 nor eyeglass reflection 50 can be detected (at S24), the procedure returns to Step S21 because it is thought that the image of the eye itself has not been taken.

In case both pupil 12 and eyeglass reflection 50 are detected (at S25), relative position deciding portion 141 calculates the relative position relation of center of gravity 51 of eyeglass reflection 50 to pupil center 13, and outputs a signal indicating the relative positions of eyeglass reflection 50, such as [Up] or [Down], (at S31) (The contents indicated by the signal will be expressed by brackets [ ]. For example, the signal indicating upward is simply expressed by [Up], and the signal indicating the unknown is simply expressed by [Unknown].). On the basis of the relative position of center of gravity 51 of eyeglass reflection 50, message creating portion 142 creates a message instructing the movement of the camera in a direction to avoid eyeglass reflection 50, such as "Eyeglass Reflection! Move up Camera." in case eyeglass reflection 50 is on pupil 12, and displays the message contents in liquid crystal display unit 148. The message contents are also outputted (at S32) as a speech message through speaker 146. Then, the procedure returns to Step S21. This speech message need not be outputted every time at this Step for the reasons, as will be explained hereinafter.

In case eyeglass reflection 50 is detected but pupil 12 cannot be detected (at S26), it is thought that pupil 12 itself is not grasped or that the position of pupil 12 and the position of eyeglass reflection 50 are superposed. In this case, relative position deciding portion 141 cannot decide the relative position of eyeglass reflection 50 so that it outputs the [Unknown]. Message creating portion 142 creates a message to instruct the movement of the camera, such as "Eyeglass Reflection! MoveCamera.", and displays the contents in liquid crystal display unit 148. The message contents are also outputted (at S41) as a speech message through speaker 146. Then, the procedure returns to Step S21. This speech message need not either be outputted every time at this stage.

In case pupil 12 is detected but eyeglass reflection 50 is not, it is thought that the proper eye image has been incorporated. Therefore, relative position deciding portion 141 outputs a signal [OK] indicating a success in the incorporation of the proper eye image. Message creating portion 142 may create a message indicating a success in the incorporation of the proper eye image, such as "Image Incorporated", and may output its contents in an image or speech (at S13). Then, the eye image incorporating operation is ended.

Here, the image incorporation of the imaging element is usually carried out at a high speed of 10 to 100 times a second, and each output of the speech message usually takes 2 to 3 seconds. It follows that the speech message cannot be outputted every time but can be outputted at a rate of once or less several seconds. At this time, the configuration may be made such that a new speech message is outputted at the instant when the previous speech message was ended. It is, however, more practical that the speech message is not issued before the identical output is made a predetermined number of times or more by observing the outputs of relative position deciding portion 141 for a predetermined time period. The speech message is further advantageous in that it can be accepted without any movement, of the line of sight even while the person to be authenticated is being authenticated.

In case the instruction is issued in the screen display portion, the message can be issued every time. However, this message may be issued like the speech message after the storage of a predetermined number of times.

Here will be described the relations between the output of relative position deciding portion 141 and the contents of the message to be created in message creating portion 142. FIG. 4A is a diagram showing the relative positions of eye 10, camera 20, near infrared ray illuminator 111 and eyeglass 30, and FIG. 4B is a diagram showing one example of eye image 40 at those relative positions. In order to take eye image 40, pupil 12 has to be positioned on or near the optical axis of camera 20, as shown in FIG. 4A. For a small-sized packaging, moreover, the optical axis of near infrared ray illuminator 111 cannot be spaced so far from the optical axis of camera 20. On the other hand, the reflected light of near infrared ray illuminator 111 by eyeglass 30, that is, eyeglass reflection 50 is determined by the position of virtual image 25 of illumination, which is formed by the reflecting face of eyeglass 30. If camera 20 is moved up when eyeglass reflection 50 is over pupil 12, therefore, eyeglass reflection 50 moves farther upward so that it goes out of eye image 40, as shown in FIG. 4B. In case the output of relative position deciding portion 141 is [Up], therefore, a message "Move up Camera." is created. This message may be "Face down." This description likewise applies to another direction. FIG. 4C is a diagram showing the relative positions of eyeglass reflection 50, the moving directions of the camera for avoiding the eyeglass reflection, and the moving directions of the face. Thus, it is desired to move the camera in the same direction as the relative position of eyeglass reflection 50, and to move the face in the direction opposed to the relative position of eyeglass reflection 50.

This embodiment has been so described that any of [Up], [Down], [OK] and [Unknown] is outputted at this time as the output of relative position deciding portion 141. However, [Right], [Left] and [Upward Right] maybe additionally outputted. More specifically, (X-coordinate, Y-coordinate) may also be outputted by using the relative position vector of the reflected light.

According to Embodiment 1 of the invention thus far described, even in case the eyeglass reflection is contained in the first image incorporated, a satisfactory eye image incorporation can be made in a smaller number of trials without disposing a plurality of illuminators apart from the camera, by using the instruction unit to give a proper instruction where the camera is to be moved or where the face is to be moved, to the person to be authenticated.

Embodiment 2

Figure 5:
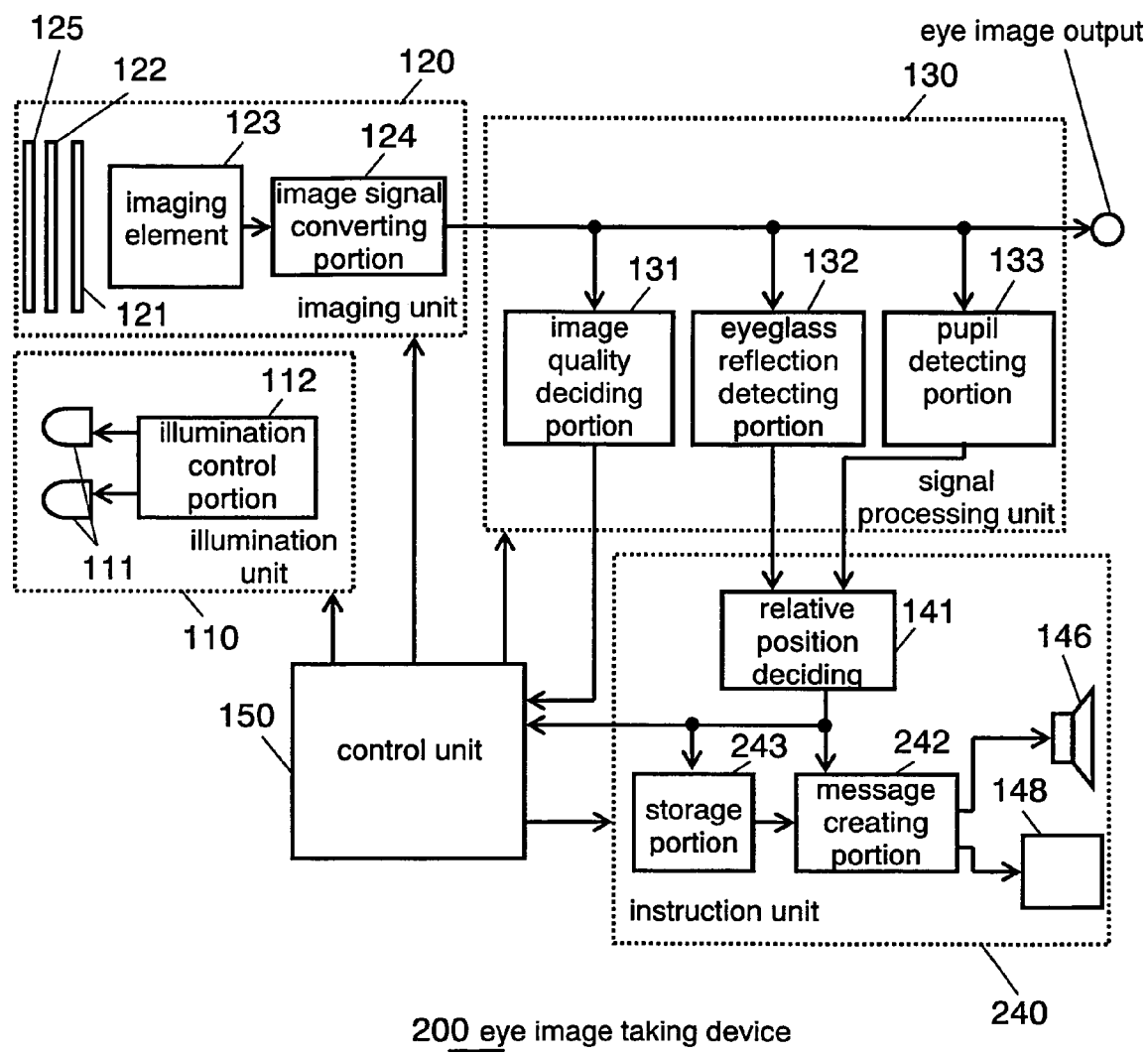
FIG. 5 is a block diagram of an eye image taking device according to Embodiment 2 of the invention.

FIG. 5 is a block diagram of an eye image taking device according to Embodiment 2 of the invention. Like Embodiment 1, the eye image taking device 200 in Embodiment 2 is provided with illumination unit 110, imaging unit 120, signal processing unit 130, instruction unit 240 and control unit 150. What is different from Embodiment 1 is that instruction unit 240 is provided therein with storage portion 243.

Storage portion 243 is assumed to store the output of relative position deciding portion 141 either in case the eye image incorporation was done in the past to output the speech message or in case the message of the success in the eye image incorporation was outputted. Message creating portion 242 creates not only a proper message on the basis of the output of relative position deciding portion 141 but also a proper message on the basis of the past message stored in storage portion 243.

Figure 6:
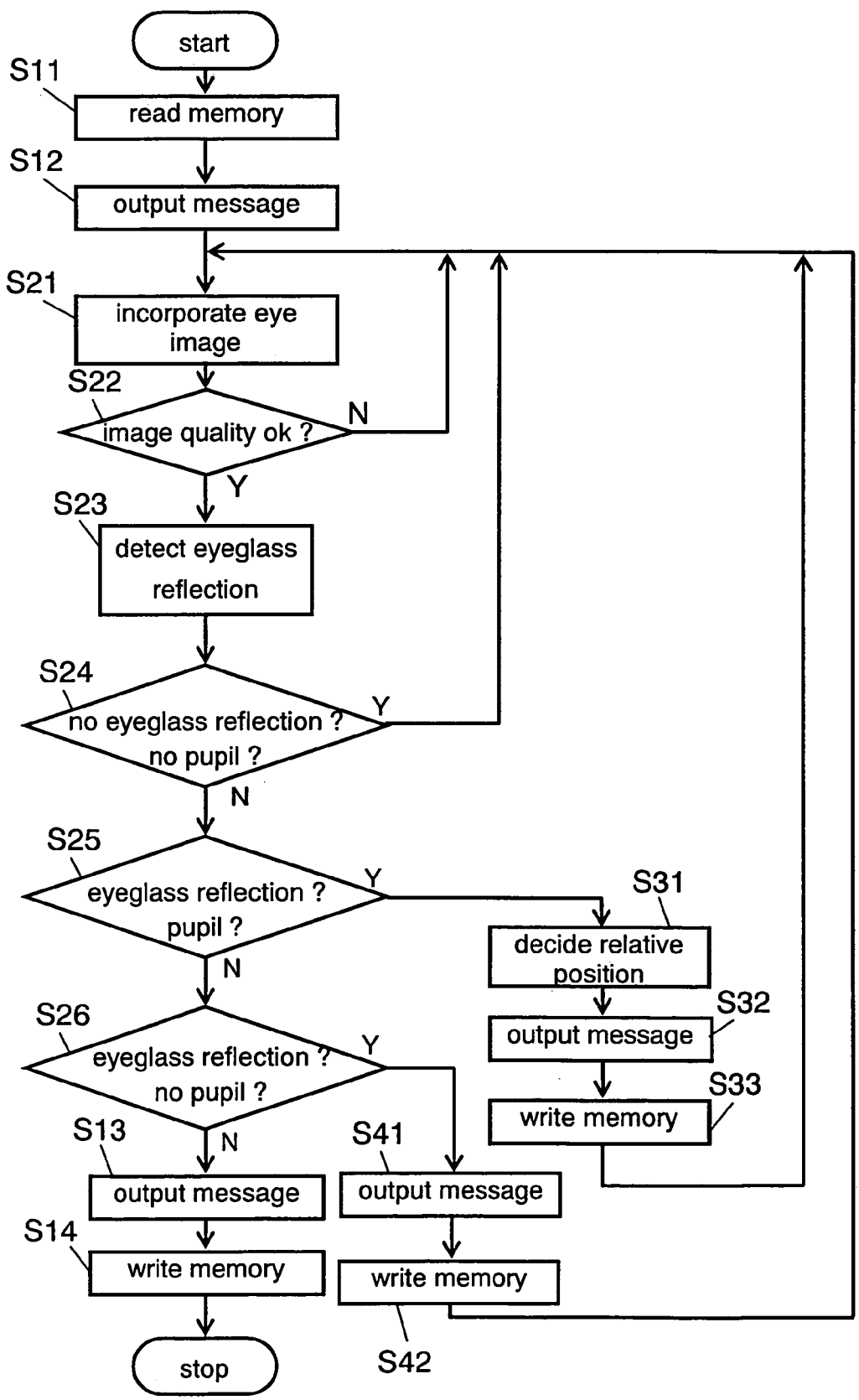
FIG. 6 is a flow-chart showing an operating procedure of the eye image taking device in Embodiment 2 of the invention.

Here will be described the operations of the eye image taking device in Embodiment 2 of the invention. FIG. 6 is a flow chart showing an operating procedure of the eye image taking device in Embodiment 2 of the invention.

When the person to be authenticated starts the authentication by performing the authentication starting operation, message creating portion 242 selects the most frequent data (at S11) by referring to the past data stored in storage portion 243. If the stored contents are [OK], [Up], [OK], [Up] and [Up] in the new order with reference to the contents of the data of the latest five times, for example, it is found that the speech message such as "Eyeglass Reflection! Move up Camera." was once outputted at the last authentication time, and that the same message was outputted two or more times at the authentication of two times before. Since the most frequent value is [Up] in this case, it is indicated that eyeglass reflection 50 occurs highly probably over pupil 12 of eye image 40 to be incorporated, because of the habit or the lack of experience of the person to be authenticated. Therefore, the instruction contents to avoid eyeglass reflection 50 anticipated are outputted as the speech message through speaker 146. The speech message may also be exemplified by "Move up Camera More than Usual, and Start Authentication." If the person to be authenticated gets familiar so that the stored contents become [OK], [OK], [OK], [Down] and [OK] in the newer order, the most frequent value is [OK]. In this case, therefore, message creating portion 242 creates, as usual, the message to start the authentication, such as "Authentication is Started." The contents are displayed in liquid crystal display unit 148 and are outputted as the speech message through speaker 146 (at S12).

Next, the incorporation of eye image 40 (at S21), the image quality decision (at S22), and the detections of eyeglass reflection 50 and pupil 12 (at S23) are performed. At this time, the procedure returns to Step S21, in case neither pupil 12 nor eyeglass reflection 50 can be detected (at S24).

In case both pupil 12 and eyeglass reflection 50 were detected (at S25), the relative position of eyeglass reflection 50 is decided (at S31), and the message is outputted (at S32). At this time, the output contents of relative position deciding portion 141, such as [Up], [Down] and so on are written in storage portion 243 (at S33). Then, the procedure returns to Step S21. Like Embodiment 1, the speech message need not be outputted every time at this Step. Moreover, the write in storage portion 243 at Step S33 need not be done every time but is done in storage portion 243 in this embodiment in case the speech message is outputted.

In case eyeglass reflection 50 was detected but pupil 12 cannot (at S26), relative position deciding portion 141 outputs [Unknown], and message creating portion 242 outputs the message to instruct the movement of the camera (at S41). The contents of [Unknown] are written in storage portion 243 (at S42). Then, the procedure returns to Step S21. At this, the speech message need neither be outputted every time, nor is the write in storage unit 243 at Step S42. In case the speech message is outputted, it is written in storage portion 243.

In case the pupil position is detected but eyeglass reflection 50 is not, relative position deciding portion 141 outputs the signal [OK] indicating the success in the eye image incorporation. Message creating portion 242 outputs the message indicating the success in the eye image incorporation (at S13). The contents of [OK] are written in storage portion 243 (at S14). Then, the eye image incorporating operation is ended.

In Embodiment 2, when the person to be authenticated starts the authentication by performing the authentication starting operation, message creating portion 242 selects the most frequent data by referring to the past data stored in storage portion 243, but may use another method to select the data. For example, the message creating portion 242 may select the latest ones of the past data stored in storage portion 243 or may select the data having the maximum sum of weight coefficients, by multiplying the newer data by the larger weight coefficient for the past data.

Since position of eyeglass reflection 50 is determined by the relative position between camera 20 and the face, as described in connection with Embodiment 1 or Embodiment 2, the instruction to move camera 20 may be outputted as the message to the person to be authenticated, or the instruction may also be one to move the face of the person to be authenticated in place of camera 20. Therefore, the message of "Move up Camera." may also be replaced by the message of "Face down."

In Embodiment 1 and Embodiment 2, moreover, the message created on the basis of the output of the relative position deciding portion is displayed in the screen display portion. However, the message may be only a speech, and the screen display portion may display either the image itself incorporated by the imaging element, as shown in FIG. 4B, or such an image that the pupil position and the position of the eyeglass reflection can be seen in real time. In the latter case, the relation of the movement of the position of the eyeglass reflection, which is taken when the eye image taking device is moved according to the speech message, can be grasped in real time so that the direction and stroke of the movement can be intuitively felt to move the camera promptly to the most proper position.

Figure 7A:
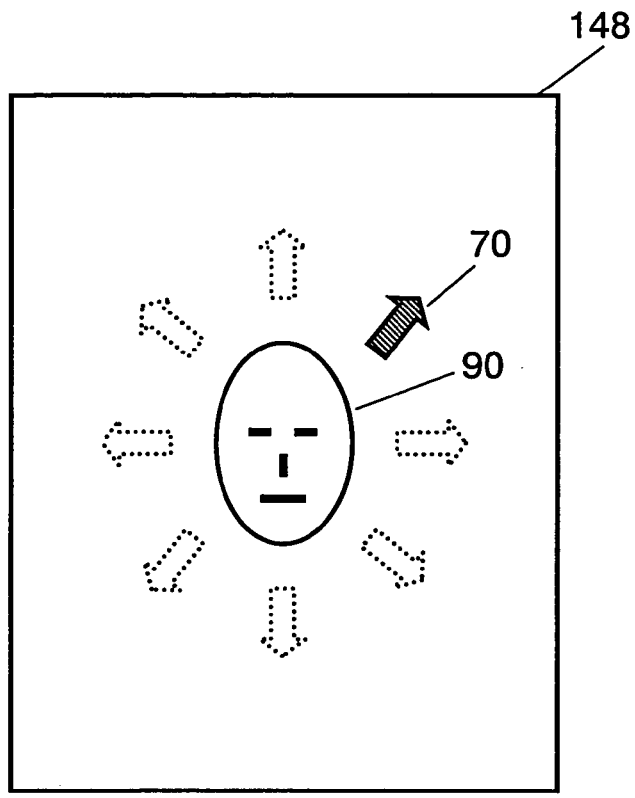
FIG. 7 presents diagrams showing other means for instructing a person to be authenticated, in Embodiment 1 or Embodiment 2 of the invention.
Figure 7B:
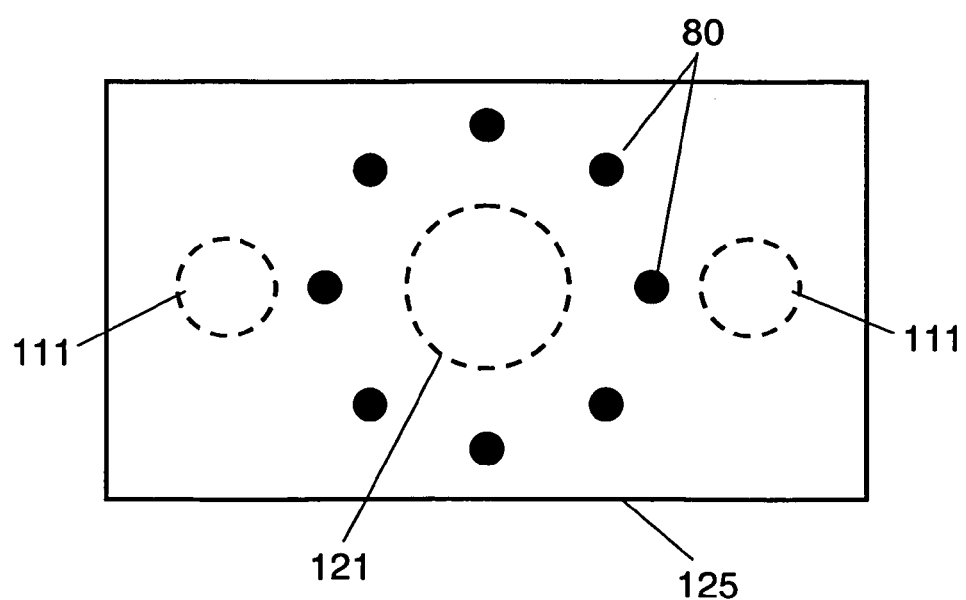

Various means other than the aforementioned ones can be conceived as the means for instructing the person to be authenticated the position of the camera or the direction of the face. FIG. 7 presents diagrams showing other means for instructing the person to be authenticated. FIG. 7A displays not only a display 90 copying the face on liquid crystal display unit 148 but also arrow 70 indicating the direction of the face to be moved. FIG. 7B presents a diagram, in which a plurality of instruction LEDs 80 are arranged around lens 121 of imaging unit 120 so that an instruction LED corresponding to the moving direction of the face is turned on. During the authentication, the person to be authenticated gazes at lens 121 through guide mirror 125. The line of sight is hardly moved if the instruction is given at instruction LED 80 arranged at that position, so that the authentication is not obstructed.

In the eye image taking device in Embodiment 2 of the invention thus far described, in case the person to be authenticated wearing eyeglasses incorporates the image, the probability that the eyeglass reflection is contained in the image to be incorporated at the initial stage is reduced by the instruction unit which gives the instruction to move the camera in a direction hard to incorporate the eyeglass reflection on the basis of the image incorporating past habit of the person to be authenticated, as stored in the storage portion.

Thus according to the invention, it is possible to provide the eye image taking device, which can acquire a satisfactory eye image having no eyeglass reflection at a reduced number of trials even in case the person to be authenticated wears the eyeglasses, without disposing a plurality of illuminators at places apart from the camera.

INDUSTRIAL APPLICABILITY

The eye image taking device of the invention can acquire a satisfactory eye image having no eyeglass reflection at a reduced number of trials even in case the person to be authenticated wears the eyeglasses, without disposing a plurality of illuminators at places apart from the camera. Thus, the eye image taking device is useful as one to be used in the iris authentication device or the like which can be installed in the mobile terminal.

The invention claimed is:

1. An eye image taking device comprising:
   an imaging unit for taking the eye of a person to be authenticated, as an eye image;
   an illumination unit for illuminating the eye of the person to be authenticated;
   an eyeglass reflection detecting unit for detecting the presence/absence and position of an eyeglass reflection from the eye image;
   a pupil detecting portion for detecting the presence/absence and position of a pupil from the eye image; and
   an instruction unit for instructing either the direction for the imaging unit to move or the direction for the face direction of the person to be authenticated to move, so as to acquire the eye image having no eyeglass reflection on the basis of the relative positions between the position of the pupil and the position of the eyeglass reflection, in case the eyeglass reflection detecting portion detects the presence of the eyeglass reflection.

2. An eye image taking device according to claim 1, wherein the direction for the imaging unit to move so as to acquire the eye image having no eyeglass reflection is identical to the direction of the relative position of the eyeglass reflection.

3. An eye image taking device according to claim 1, wherein the direction for the face of the person to be authenticated to move so as to acquire the eye image having no eyeglass reflection is opposed to the direction of the relative position of the eyeglass reflection.

4. An eye image taking device according to claim 1, further comprising a storage portion for storing the instruction contents of the instruction unit, wherein the instruction unit instructs either the direction for the imaging unit to move or the direction of the face of the person to be authenticated to move, on the basis of the contents stored in the storage portion.

5. An eye image taking device according to claim 4, wherein the instruction unit instructs the same contents as those of the highest frequency of the contents stored in the storage portion.

6. An eye image taking device according to claim 4, wherein the instruction unit includes a speech output unit for issuing an instruction in a speech.

7. An eye image taking device according to claim 4, wherein the instruction unit includes a display unit for displaying an arrow indicating the direction for the face to move.

8. An eye image taking device according to claim 4, wherein the instruction unit includes a plurality of instruction LEDs for turning on an LED indicating the direction for the face to move.

9. An eye image taking device according to claim 1, wherein the instruction unit includes a speech output unit for issuing an instruction in a speech.

10. An eye image taking device according to claim 1, wherein the instruction unit includes a display unit for displaying an arrow indicating the direction for the face to move.

11. An eye image taking device according to claim 1, wherein the instruction unit includes a plurality of instruction LEDs for turning on an LED indicating the direction for the face to move.

* * * * *

UNITED STATES PATENT AND TRADEMARK OFFICE
CERTIFICATE OF CORRECTION

PATENT NO.        : 7,216,982 B2                                              Page 1 of 1
APPLICATION NO.   : 10/525190
DATED             : May 15, 2007
INVENTOR(S)       : Takeshi Fujimatsu et al.

It is certified that error appears in the above-identified patent and that said Letters Patent is hereby corrected as shown below:

Page 1, Item (56) References Cited, FOREIGN PATENT DOCUMENTS
Change "WO    WO 99/38121    7/1999"
to -- WO     99/38121     7/1999 --

Column 8
Line 43, change "4" to -- 1 --

Column 8
Line 46, change "4" to -- 1 --

Column 8
Line 50, change "4" to -- 1 --

Column 8
Line 54, change "1" to -- 4 --

Column 8
Line 57, change "1" to -- 4 --

Column 8
Line 61, change "1" to -- 4 --

Signed and Sealed this

Sixteenth Day of October, 2007

JON W. DUDAS
*Director of the United States Patent and Trademark Office*